Oct. 30, 1923. Re. 15,708

C. LAIDMAN

TABLE MAT

Original Filed May 29, 1920

INVENTOR

Charles Laidman

BY Baker & Macklin,

ATTYS.

Reissued Oct. 30, 1923. Re. 15,708

UNITED STATES PATENT OFFICE.

CHARLES LAIDMAN, OF CLEVELAND, OHIO.

TABLE MAT.

Original No. 1,378,471, dated May 17, 1921, Serial No. 385,124, filed May 29, 1920. Application for reissue filed April 26, 1923. Serial No. 634,860.

*To all whom it may concern:*

Be it known that I, CHARLES LAIDMAN, a citizen of the United States, residing at Cleveland, in the county of Cuyahoga and State of Ohio, have invented new and useful Improvements in Table Mats, of which the following is a specification.

This invention relates to table mats of the type adapted to be inserted between a table top and a cover to prevent the marring of the table surface by heated dishes placed upon the cover.

An object of my invention is to so construct the table mat that it may be folded in sections, whereby the complementary edges of adjacent sections are in abutting engagement when the mat is placed upon the table. A further object is to provide a mat that is strong, efficient and capable of being cheaply manufactured. The above and other objects become more apparent in the following description which pertains to the accompanying drawings. The essential characteristics are set forth in the claims.

Figure 2:
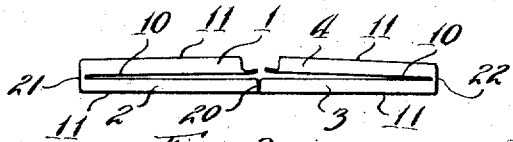
Figure 3:
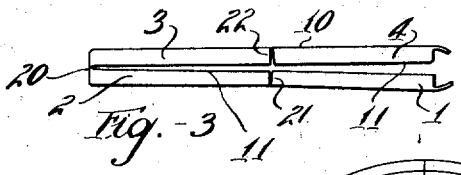
Figure 4:
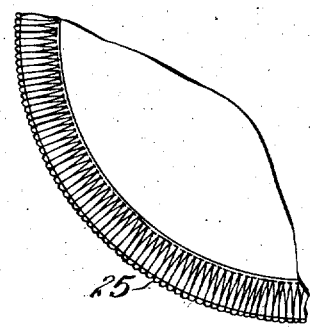
Figure 1:
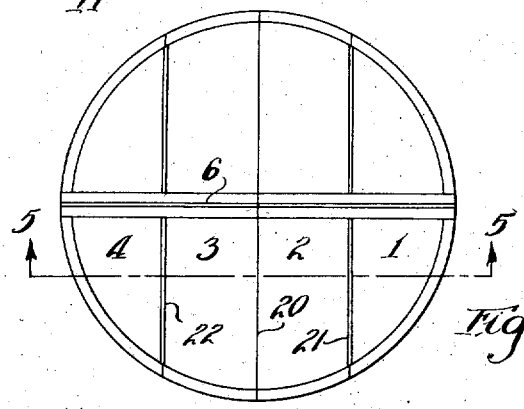
Figure 5:
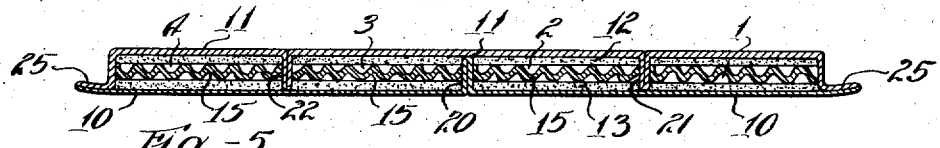
Figure 6:
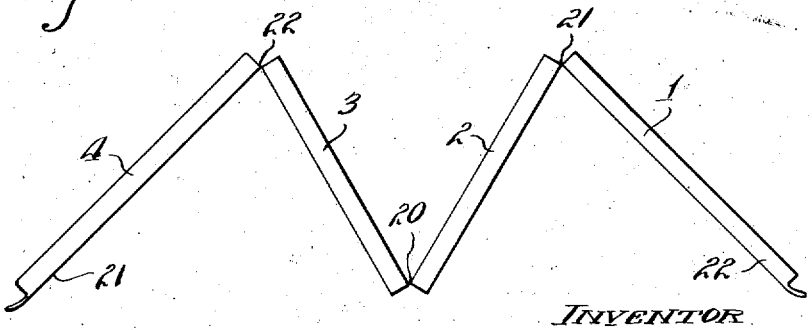

In the drawings, Fig. 1 is a plan of a table mat adapted to be used on a closed round or oval table; Figs. 2 and 3 are end elevations showing the method of folding the sections of the table mat; Fig. 4 is a fragmentary section of a table mat showing the feature of overcast stitching; Fig. 5 is a section through the mat taken substantially on the line 5—5 in Fig. 1; Fig. 6 is an end elevation of a mat partly folded.

Designating the parts by the use of reference characters, in Fig. 1, 1, 2, 3 and 4 represent parts of one section of a mat. This mat as shown comprises two sections, each section occupying one-half the area of a table top. The improved protector shown herein is circular in form but it may be made up of sections adapted to conform to the shape of any table top.

The main body portions of my invention comprise a suitable filler 15 shown as of corrugated material such as straw board, with layers 12 and 13 of non-conducting material disposed above and below the filler and a protecting cover extending entirely around the outer surface of the non-conducting layers. Any suitable heat insulating material may be employed and may be secured to the filler by a waterproof glue or some other adhesive material.

The upper surface of the mat is protected by a waterproof cover 11, comprising a single piece of material extending in one plane, across the sections 2 and 3, but extending in a fold from the upper to the lower surface of the mat between the abutting edges of the sections 1 and 2 and between the sections 3 and 4. The covering material for the upper surface of the mat is applied when the sections are folded into the position as shown in Fig. 2. When in this position, the waterproof covering 11 may be stretched tightly across the sections 1 and 2, then over the ends 21 and 22 and then horizontally over the end sections 1 and 4. On opening the mat that portion of the cover 11, extending across the edges 21 and 22, forms a hinged joint.

The bottom layer 10, preferably of flannel or any soft fabric, is secured to the lower heat insulating layer 13 with paste or glue. To secure this cover to the bottom of the heat insulating layer, the sections are folded to the form shown in Fig. 3, wherein the upper cover 11 is folded upon itself and sections 3 and 4 are positioned above sections 1 and 2. The fabric 10 can now be stretched on the bottom of the sections 1 and 2, then upwardly over the edges 20, and then horizontally over the sections 3 and 4. When the mat is opened, the lower fabric extends in one plane across the sections 1 and 2 and across the sections 3 and 4. Between the sections 2 and 3, however, the lower fabric extends in a fold from the bottom of the mat to the top thereof and seals the complementary edges of these two sections.

The upper and lower covering sheets extend beyond the filler at the circular marginal edges and are secured together by overcast stitching 25 as shown in Fig. 4. By securing the fabrics together in this manner there is a material reduction in the time required to bind the upper and lower surfaces together, an effective junction is provided and a finished and pleasing appearance given to the mat.

It will be seen that I have provided a mat, wherein the fabric on the top and bottom surfaces thereof constitute hinges about which the sections may be folded. Such a construction greatly facilitates the manufacture of table mats, since the necessity of providing separate hinges is dispensed with. In addition, it permits the complementary edges of adjacent sections to be in abutting engagement with each other. The advantages of this type of construction are that a strong and effective table mat, having close fitting complementary edges, is produced.

I claim:—

1. A table mat comprising a plurality of heat insulating sections and a pair of flexible covering sheets disposed on the opposite sides of said heat insulating sections respectively and secured thereto, said covering sheets being arranged to provide hinges which are defined by a flat portion of one of the sheets extending across the joint and a portion of the opposite sheet folded to extend between the adjoining edges of the sections, the innermost edge of the fold being in engagement with the inner side of the first mentioned sheet, and each hinge opening in a direction opposite to the direction of the adjacent hinge.

2. A table mat comprising a plurality of heat insulating sections each consisting of an inner member and heat insulating layers on opposite sides thereof, and a pair of flexible covering sheets disposed on the opposite sides of said heat insulating sections respectively and secured to said heat insulating layers, said covering sheets being arranged to provide hinges which are defined by a flat portion of one of the sheets extending in a continuous plane across the joint and a portion of the opposite sheet folded to extend between the adjoining edges of the sections, the innermost edge of the fold being in engagement with the inner side of the first mentioned sheet and each hinge opening in a direction opposite to the direction of the adjacent hinge.

3. A table mat comprising a plurality of heat insulating sections, each section comprising an inner member and heat insulating members on each side of said inner member, and a flexible covering sheet disposed upon each heat insulating member, said covering sheets being arranged to provide hinges, which are defined by a flat portion of the sheet extending across the joint and a portion of the opposite sheet folded to extend between the adjoining edges of the sections, the upper and lower covering sheets extending beyond said members and secured together, each hinge opening in a direction oposite to the direction of the adjoining hinge, whereby the mat may be compactly folded.

4. A table mat comprising a plurality of heat insulating sections, each section comprising a corrugated inner member and heat insulating members on each side of the corrugated member, and a flexible covering sheet disposed upon each heat insulating member, said covering sheets being arranged to provide hinges, which are defined by a flat portion of the sheet extending across the joint and a portion of the opposite sheet folded to extend between the adjoining edges of the sections, the upper and lower covering sheets extending beyond the corrugated filler and secured together, each hinge opening in a direction opposite to the direction of the adjoining hinge, whereby the mat may be compactly folded.

5. In a table mat, the combination of a series of panels with adjacent edges, cover members secured to opposite sides of said series of panels, each cover member extending continuously across two adjacent panels, and doubling on itself between the adjacent edge of one of said panels and the panel next thereto, the doubled portion of each cover sheet being opposite a continuous portion of the other cover sheet and having its bend attached thereto, whereby the hinges are alternately at the top and bottom faces of the mat.

Signed at Cleveland, Ohio, this 25th day of April, 1923.

CHAS. LAIDMAN.